Feb. 10, 1931. E. J. VON PEIN 1,791,775
SCALE WASHER
Filed Nov. 27, 1929
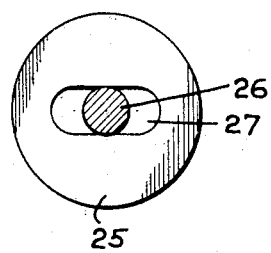
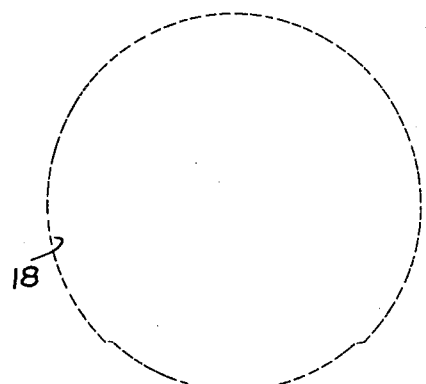
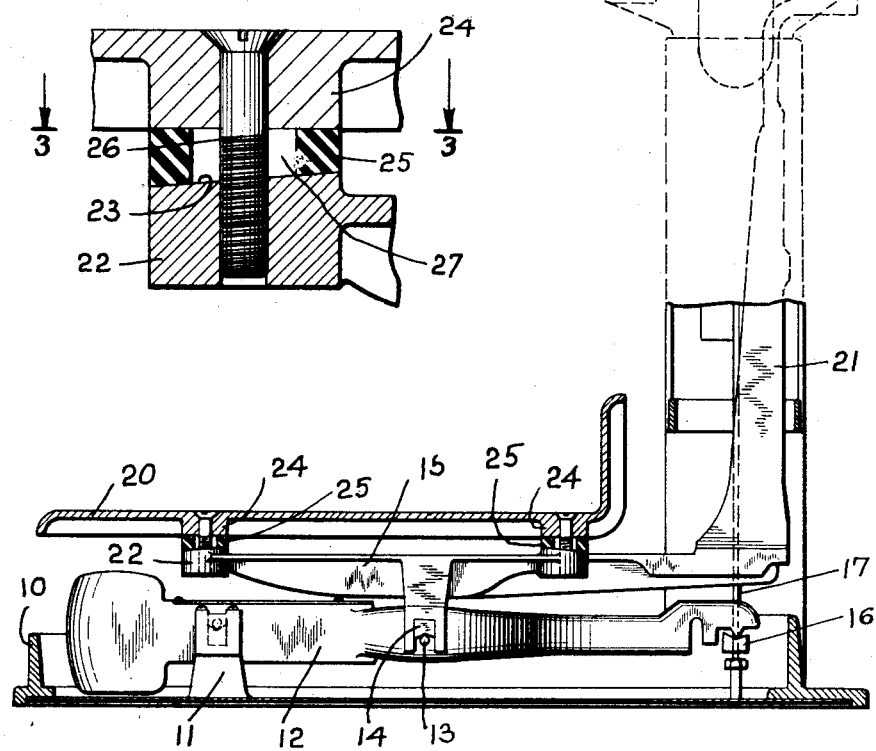
Inventor
Edward J. von Pein
By his Attorney
W. M. Wilson Patented Feb. 10, 1931

1,791,775

UNITED STATES PATENT OFFICE

EDWARD J. VON PEIN, OF DAYTON, OHIO, ASSIGNOR TO DAYTON SCALE COMPANY, OF DAYTON, OHIO, A CORPORATION OF NEW JERSEY

SCALE WASHER

Application filed November 27, 1929. Serial No. 410,110.

This case relates to improvements in platform structures of scales.

The platform structure is ordinarily supported on a knife edge bearing, which constitutes a pivot fixing the moment arm of the load on the platform. The accuracy of the scale is dependent on the fineness of the knife edge. When a load is suddenly dropped on the platform or removed therefrom, the knife edge bearing receives a shock which chips or blunts the edge. As a result, the bearing must be replaced or the scale will operate unsatisfactorily.

Further, when the platform is supported on a spider which in turn is carried by the knife edge, there is often difficulty in fitting the platform to the spider so that the platform will not rock on the spider.

The object of this invention is to provide means for absorbing the shock when a load is placed on or removed from the platform.

The object is further to provide shock absorbing means which will be adapted to prevent rocking of a platform relative to its supporting spider.

Still further, the object is to provide such shock absorbing means as will permit the level of the platform to be adjusted.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

In the drawings:

Fig. 1 is a side elevation of the scale with the platform portion in section.

Fig. 2 is a detail section of a shock absorbing element applied to the platform, and Fig. 3 is a section on line 3—3 of Fig. 2.

In detail, the scale comprises a base 10 provided with fulcrum stands 11 on which is pivotally mounted the base lever 12. The latter is provided intermediately with a knife edge 13 on which rests the agate bearing 14 of the platform spider frame 15. The inner end of the lever 12 bears on a stirrup 16 carried at the lower end of the draft rod 17. The rocking of lever 12 is communicated through the draft rod to the usual rack and pinion means (not illustrated) for operating the scale chart or pointer, as the case may be. In the instant case, the chart (not shown) is of the drum type and is housed in the casing 18.

The spider 15 supports on four rectangularly disposed corners thereof the platform 20.

In order to prevent tipping of the spider 15 and the platform thereon when a load is placed off-center on the platform, the usual overhead check 21 is provided.

The four corners of the spider 15 are formed as posts 22 with the top surfaces 23 inclined. The surfaces 23 on the forward end of the spider are inclined oppositely to the surfaces 23 on the rear end of the spider. Between the bottom of the platform lugs 24 and the inclined surfaces 23, rubber washers 25 are disposed. The bottom of the washer is inclined to fit flush with surface 23. A screw 26 passes through a hole in the lug 24 of the platform, the head of the screw seating against the platform so as to move the platform with it when turned. The screw is threaded into the post 22 and passes through an elongated slot 27 in the washer 25.

The platform 20 if out of level, may be adjusted to be in level, by moving the washers in the direction of their slots. The inclined surfaces of the washer coacting with surfaces 23 thus serve to vertically adjust the platform 20 and adjust the level thereof.

The washers also serve as wedges adjustable to tightly secure the platform 20 to the spider 15 and thus prevent rocking of the platform on the spider. Further, if the top surfaces of all the washers do not lie in the same plane, the platform will rock on the washers. This is avoided by adjusting the level of the washers till they lie in the same plane. The pressure of the rubber washers may be equalized at all four corners of the spider by loosening or tightening the screws 26.

It is thus seen that in addition to acting as shock absorbers, the rubber washers serve to adjust the level of the platform and prevent any rocking thereof. Further, the provision for equalizing the tension of the washers is peculiar to the novel structure disclosed herein.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a weighing scale, a platform, a support therefor, and shock absorbing means between the support and the platform comprising blocks of flexible material and means for permitting adjustment of the blocks to level the platform.

2. In a weighing scale, a platform, a support therefor, and shock absorbing means between the support and the platform comprising a plurality of spaced blocks of flexible material, and means for adjusting the pressure exerted by each block.

3. In a weighing scale, a platform, a support therefor provided with spaced inclined surfaces, and flexible washers disposed between said platform and support and having inclined surfaces complementary to the first-named inclined surfaces, the washers being adjustable to move the inclined surfaces thereof relatively to the first-named inclined surfaces and thereby adjust the height of the washers.

4. In a weighing scale, a platform, a support therefor, washers of flexible material between said platform and support, screws passing freely through said platform and having their heads bearing against the platform, the screws passing through the washers and being threaded into said support, adjustment of the screws serving to vary the pressure exerted by the washers.

5. In a weighing scale such as defined in claim 4, said washers being wedge-shaped and having elongated slots through which the screws pass, the elongated slots permitting the washers to be adjusted in the direction of the slots so that their top surfaces lie in the same plane, thereby preventing rocking of the platform thereon.

In testimony whereof I hereto affix my signature.

EDWARD J. VON PEIN.